US011593714B2

(12) United States Patent
Agrawal et al.

(10) Patent No.: US 11,593,714 B2
(45) Date of Patent: Feb. 28, 2023

(54) ADAPTIVE ANOMALY DETECTOR

(71) Applicant: Citrix Systems, Inc., Ft. Lauderdale, FL (US)

(72) Inventors: Aman Agrawal, Bangalore (IN); Josephine Suganthi Joseph Leo, Sunnyvale, CA (US); Kasirao Velugu, Bangalore (IN); Praveen Dandin, Fremont, CA (US); Rama Rao Katta, Fremont, CA (US); Ratnesh Singh Thakur, San Jose, CA (US); Seth Kenneth Keith, Scotts Valley, CA (US); Rakesh Thangellapalli, Milpitas, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 292 days.

(21) Appl. No.: 16/906,119

(22) Filed: Jun. 19, 2020

(65) Prior Publication Data
US 2021/0350277 A1 Nov. 11, 2021

(30) Foreign Application Priority Data

May 6, 2020 (IN) ............................ 202011019340

(51) Int. Cl.
*G06F 21/00* (2013.01)
*G06N 20/00* (2019.01)
(Continued)

(52) U.S. Cl.
CPC .............. *G06N 20/00* (2019.01); *G06N 3/04* (2013.01); *G06N 3/08* (2013.01); *H04L 63/1416* (2013.01);
(Continued)

(58) Field of Classification Search
CPC ............ G06N 20/00; G06N 3/04; G06N 3/08; G06N 20/10; G06N 5/046; H04L 63/1416;
(Continued)

(56) References Cited

U.S. PATENT DOCUMENTS 8,069,210 B2 11/2011 Gillum et al.
11,210,397 B1* 12/2021 Sharif .................... G06F 21/566
(Continued)

OTHER PUBLICATIONS

PCT International Search Report and Written Report for Application No. PCT/US2021/029007 dated Jul. 6, 2021, 16 pages.
(Continued)

*Primary Examiner* — Trong H Nguyen
*Assistant Examiner* — Michael M Lee

(57) ABSTRACT

A computer system is provided. The computer system includes a memory, a network interface, and a processor coupled to the memory and the network interface. The processor is configured to receive a response to a request to verify whether an ostensible client of a service is actually a client or a bot, the response including an indicator of whether the ostensible client is a client or a bot; receive information descriptive of interoperations between the ostensible client and the service that are indicative of whether the ostensible client is a client or a bot; and train a plurality of machine learning classifiers using the information and the indicator to generate a next generation of the plurality of machine learning classifiers.

20 Claims, 12 Drawing Sheets

(51) Int. Cl.
*G06N 3/04* (2023.01)
*H04L 9/40* (2022.01)
*G06N 3/08* (2023.01)

(52) U.S. Cl.
CPC ...... *H04L 63/1425* (2013.01); *H04L 63/1483* (2013.01)

(58) Field of Classification Search
CPC ............. H04L 63/1425; H04L 63/1483; H04L 2463/144; H04L 63/1466
See application file for complete search history.

(56) References Cited

U.S. PATENT DOCUMENTS

| | | | |
|---|---|---|---|
| 2011/0208714 A1 | 8/2011 | Soukal et al. | |
| 2017/0061326 A1* | 3/2017 | Talathi | G06K 9/6267 |
| 2017/0353477 A1* | 12/2017 | Faigon | G06F 21/6209 |
| 2018/0077181 A1 | 3/2018 | Chen et al. | |
| 2018/0285772 A1* | 10/2018 | Gopalan | G06N 20/00 |
| 2018/0314971 A1* | 11/2018 | Chen | G06N 20/00 |
| 2019/0102675 A1* | 4/2019 | Biswas | G06N 7/005 |
| 2019/0340533 A1* | 11/2019 | Copper | G06N 3/084 |
| 2019/0356684 A1 | 11/2019 | Sinha et al. | |
| 2020/0099713 A1 | 3/2020 | Rajput et al. | |
| 2020/0134510 A1* | 4/2020 | Basel | G06N 3/084 |
| 2020/0160207 A1* | 5/2020 | Song | G06F 11/3466 |
| 2020/0396233 A1* | 12/2020 | Luo | G06F 21/316 |
| 2021/0037048 A1* | 2/2021 | Kurupati | H04L 63/1441 |

OTHER PUBLICATIONS

Folino Gianluigi et al: "A Cybersecurity Framework for Classifying Non Stationary Data Streams Exploiting Genetic Programming and Ensemble Learning", Feb. 14, 2020 (Feb. 14, 2020), Advances in Intelligent Data Analysis XIX; Springer International Publishing, Cham, pp. 269-277, XP047535536, ISSN: 0302-9743; ISBN: 978-3-030-71592-2.

Cruz Rafael M O et al: "Dynamic classifier selection: Recent advances and perspectives", Information Fusion, vol. 41, Sep. 11, 2017 (Sep. 11, 2017), pp. 195-216, XP085265397, ISSN: 1566-2535, DOI: 10.1016/J.INFFUS.2017.09.010.

Salman; Tara et al., Machine Learning for Anomaly Detection and Categorization in Multi-cloud Environments, Qatar National Research Fund, 7 pages.

Mobilio; Marco et al., Anomaly Detection As-a-Service, University of Milano—Bicocca, Milan, Italy, arXiv:1909.08378v1[cs.SE] Sep. 18, 2019, 7 pages.

Singh; Karanjit et al., Outlier Detection: Applications and Techniques, IJCSI International Journal of Computer Science Issues, vol. 9, Issue 1, No. 3, Jan. 2012, ISSN (Online): 1694-0814, www.IJCSI.org, 17 pages.

* cited by examiner

ADAPTIVE ANOMALY DETECTOR

RELATED APPLICATIONS

This application claims priority under 35 U.S.C. § 119(a) to Indian Provisional Patent Application No. 202011019340, titled "ADAPTIVE ANOMALY DETECTOR," filed on May 6, 2020, which is hereby incorporated herein by reference in its entirety.

BACKGROUND

Anomaly detection processes identify samples within a population that possess attributes that depart significantly from the norm. Anomaly detection processes can employ any of a variety of specialized heuristic, statistical, or machine learning approaches to identify aberrant samples. Each of these approaches has benefits and disadvantages. For instance, heuristic approaches are often easy to implement and computationally efficient but can be inaccurate or imprecise. Statistical approaches can be precise, accurate, and computationally efficient but require an understanding of the underlying distribution a priori to be effective. Machine learning approaches can also be precise, accurate, and computationally efficient (once trained) but require computationally complex training on large sets of data. Anomaly detection processes can be useful in a variety of applications, such as fraud, fault, and intrusion detection, among others.

SUMMARY

In at least one example, a computer system is provided. The computer system includes a memory, a network interface, and at least one processor coupled to the memory and the network interface. The at least one processor is configured to receive a response to a request to verify whether an ostensible client of a service is actually a client or a bot, the response including an indicator of whether the ostensible client is a client or a bot; receive information descriptive of interoperations between the ostensible client and the service that are indicative of whether the ostensible client is a client or a bot; and train a plurality of machine learning classifiers using the information and the indicator to generate a next generation of the plurality of machine learning classifiers.

At least some examples of the computer system can include one or more of the following features. The information descriptive of the interoperations can include one or more of source Internet Protocol (IP) address, destination IP address, source port, destination port, protocol, total packets exchanged, average inter arrival time of packets, and average time between mouse clicks. The plurality of machine learning classifiers comprises one or more of an artificial neural network, a Bayesian network, and support vector machine. The plurality of machine learning classifiers can include a master classifier and one or more community classifiers. The one or more community classifiers can include a peer classifier, an alpha classifier, and an historical classifier. The at least one processor can be further configured to calculate an accuracy of each machine learning classifier of the next generation. The at least one processor can be further configured to determine whether any particular machine learning classifier of the next generation has an accuracy that transgresses a threshold value based on the accuracy of an ancestor classifier of the particular machine learning classifier; and replace the particular machine learning classifier with the ancestor classifier where the accuracy of the particular machine learning classifier transgresses the threshold value. The at least one processor can be further configured to determine whether any particular machine learning classifier of the next generation has an accuracy that transgresses a threshold value based on the accuracy of the master classifier; and replace the master classifier with the particular machine learning classifier to generate a new master classifier where the accuracy of the particular machine learning classifier transgresses the threshold value. The at least one processor is further configured to store the master classifier in a data store. The plurality of machine learning classifiers can be a first plurality of machine learning classifiers and the at least one processor can be further configured to add, as a peer classifier, the new master classifier to a second plurality of machine learning classifiers comprising a second master classifier.

In another example, a method of automatically training a plurality of machine learning classifiers to detect bots is provided. The method can include receiving a response to a request to verify whether an ostensible client of a service is actually a client or a bot, the response including an indicator of whether the ostensible client is a client or a bot; receiving information descriptive of interoperations between the ostensible client and the service that are indicative of whether the ostensible client is a client or a bot; and training a plurality of machine learning classifiers using the information and the indicator to generate a next generation of the plurality of machine learning classifiers.

At least some examples of the method can include one or more of the following features. Receiving the information can include receiving information including one or more of source Internet Protocol (IP) address, destination IP address, source port, destination port, protocol, total packets exchanged, average inter arrival time of packets, and average time between mouse clicks. Training the plurality of machine learning classifiers can include training a master classifier and one or more community classifiers. The method can further include calculating an accuracy of each machine learning classifier of the next generation. The method can further include determining whether any particular machine learning classifier of the next generation has an accuracy that transgresses a threshold value based on the accuracy of an ancestor classifier of the particular machine learning classifier; and replacing the particular machine learning classifier with the ancestor classifier where the accuracy of the particular machine learning classifier transgresses the threshold value. The method can further include determining whether any particular machine learning classifier of the next generation has an accuracy that transgresses a threshold value based on the accuracy of the master classifier; and replacing the master classifier with the particular machine learning classifier to generate a new master classifier where the accuracy of the particular machine learning classifier transgresses the threshold value. In the method, the plurality of machine learning classifiers can be a first plurality of machine learning classifiers, and the method further include adding, as a peer classifier, the new master classifier to a second plurality of machine learning classifiers comprising a second master classifier.

In another example, a non-transitory computer readable medium storing processor executable instructions to automatically train a plurality of machine learning classifiers is provided. The instructions include instructions to: receive a response to a request to verify whether an ostensible client of a service is actually a client or a bot, the response including an indicator of whether the ostensible client is a client or a bot; receive information descriptive of interoperations between the ostensible client and the service that are indicative of whether the ostensible client is a client or a bot; and train a plurality of machine learning classifiers using the information and the indicator to generate a next generation of the plurality of machine learning classifiers.

At least some examples of the computer readable medium can include one or more of the following features. The computer readable medium can further include instructions to calculating an accuracy of each machine learning classifier of the next generation. In addition, the computer readable medium can further include instructions to determine whether any particular machine learning classifier of the next generation has an accuracy that transgresses a threshold value based on the accuracy of a master classifier; and to replace the master classifier with the particular machine learning classifier to generate a new master classifier where the accuracy of the particular machine learning classifier transgresses the threshold value.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
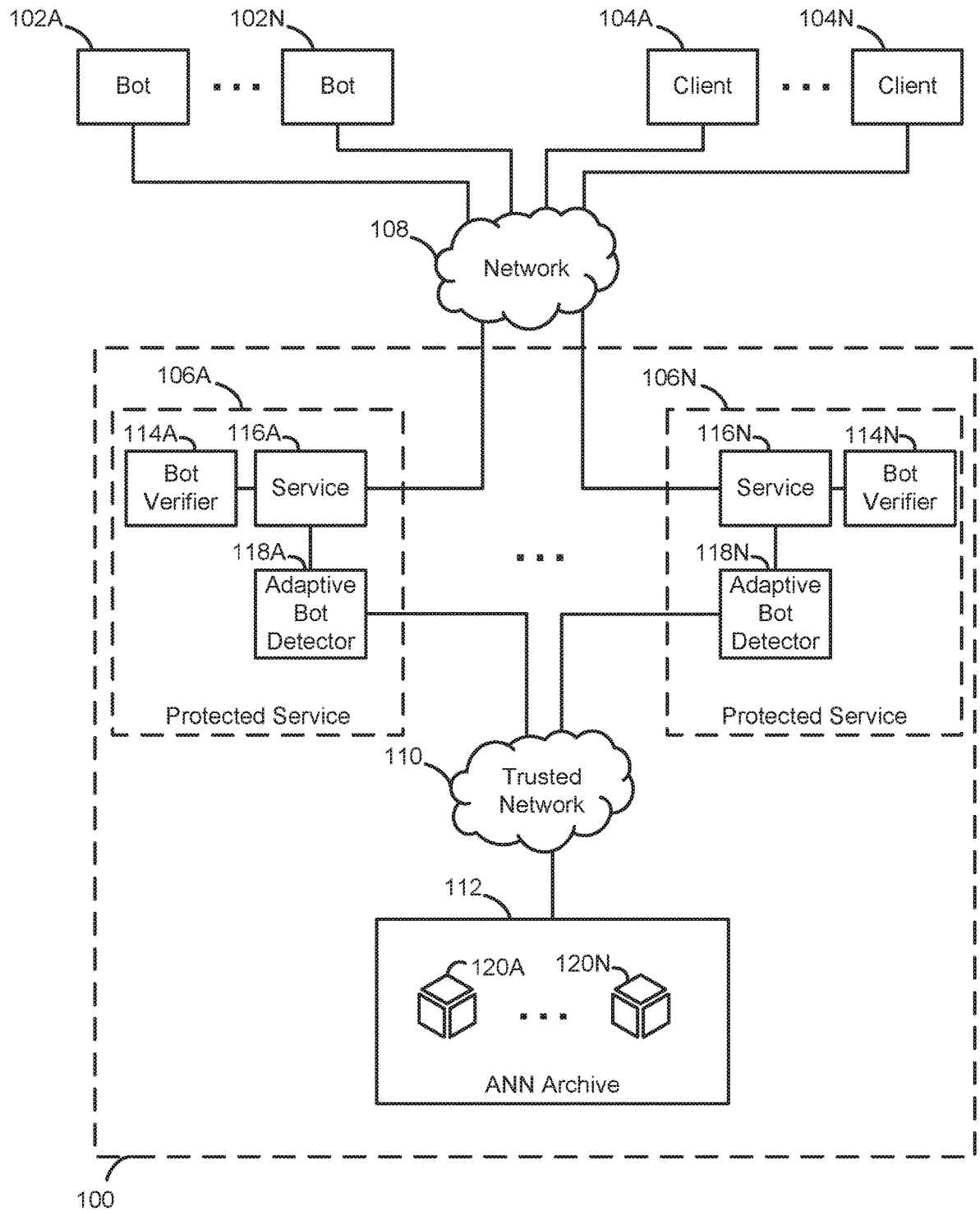
FIG. 1 is a block diagram of a system including a network computing platform with an adaptive bot detector in accordance with an example of the present disclosure.

As summarized above, at least some examples described herein are directed to systems and methods that embody innovative anomaly detection techniques to identify web robots (bots) that attempt to interoperate with computing services provided over a network. Bots are programs that interact with users or other programs in a manner that can emulates a user, often to nefarious effect. Today the Internet is increasingly crippled by bots. By some estimates, bots consume a full 40% of the capacity of the Internet. In addition, bots perform every sort of mischief from password spraying to gold farming to attempted subversion of the electoral process.

Reliably detecting even previously discovered and documented bots is a difficult problem. Bots deploy all variety of subterfuge to thwart bot detection strategies. Moreover, bot manufacturers outnumber bot defense programmers by an increasing margin. Bot manufactures make bot variants easy to create and share, and so the problem seems difficult indeed.

To combat this scourge, artificial neural network (ANN) bot detection engines have emerged. While these ANN bot detection engines have met with some success, they also suffer from some disadvantages. The effectiveness of an ANN bot detection engine is limited by its training set, which, in turn, is limited to describing bots previously discovered by human experts. Thus, even ANN bot detection engines can be overwhelmed by new bot variants.

To address the disadvantages described above, as well as other issues, adaptive bot detection systems and processes are provided. These systems and processes utilize iterative feedback techniques to converge toward higher bot detection accuracy. Via these techniques, the system and process described herein can mitigate problems introduced by new bot variants by evolving ANN bot detection engines to identify a higher percentage of bot variants and "zero day bots" (e.g., bots of a type not previously discovered) than other bot detection techniques.

In some examples, the adaptive bot detection system includes an ANN engine that operates in-line as a machine learning classifier, constantly attempting to detect bots. For ease of reference, this ANN engine is referred to herein as a master ANN engine. The master ANN engine is associated with and applies an ANN trained to detect bots using the best available training set. For ease of reference, this ANN is referred to herein as a master ANN. Where the master ANN engine detects a bot, the master ANN engine requests that a "completely automated public Turing test to tell computers and humans apart" (CAPTCHA) challenge be issued to the detected bot. The response to the CAPTCHA challenge indicates definitively whether the detected bot is an actual bot, or a user, and informs an iterative learning process implemented within the system.

More specifically, the system includes a community of ANN engines. This community includes the master ANN engine and other ANN engines that are each training a respective, associated ANN. For ease of reference, these other ANN engines are referred to herein as community engines. In certain examples, the community engines do not detect bots in-line, but rather each community engine trains its associated community ANN, based on the responses to the CAPTCHA challenges and associated information therewith. In these examples, the community engines train their associated community ANNs as potential replacements for the master ANN. In some examples, the system seeds initial copies of the associated ANNs from an ANN archive that resides outside the community. This ANN archive, which is described in further below, can store ANNs associated with other master ANN engines or other ANNs recorded as having a threshold accuracy.

In some examples, to train their associated ANNs, each of the community engines uses a set of parameters relevant to bot detection and associated with the request for the CAPTCHA challenge issued by the master ANN engine. The set of parameters can include, for example, click time, page traversal history, and file type, among others. As each CAPTCHA challenge generates ground truth information (e.g., a bot/no-bot determination), the parameters associated with the request for the CAPTCHA challenge, in conjunction with the bot/no-bot determination, provide sufficient information to execute a learning stroke for ANNs in the community. For ease of reference, the set of parameters relevant to bot detection and the ground truth information generated by the CAPTCHA challenge are collectively referred to herein as a teachable moment.

In some examples, CAPTCHA challenges can be requested by bot detectors other than adaptive bot detectors. For instance, in some examples, statistical and/or heuristic bot detectors request CAPTCHA challenges that can then be utilized by ANN engines to train their associated ANNs. Similarly, in some examples, the system can randomly request CAPTCHA challenges that can be utilized by ANN engines to train their associated ANNs. These randomly requested CAPTCHA challenges can help identify zero day bots and allow the associated ANNs in the community to learn to identify the zero day bots.

In certain examples, the system uses teachable moments to evaluate the accuracy of each associated ANN, which can result in evolution (e.g., replacement of the master ANN with another ANN from a community engine). For instance, in some examples, the system provides each teachable moment to the master ANN engine, each of the community engines, and an ANN administrator that generates records that indicate whether the master ANN engine and each of the community engines made an accurate bot/no-bot determination. Further, in these examples, the ANN administrator uses these records to maintain accuracy information for the master ANN engine and each of the community engines. This accuracy information reflects the accuracy of the master ANN engine and each of the community engines over time. Where the accuracy of a particular community engine exceeds the accuracy of the master ANN engine by more than a threshold amount, the system replaces the master ANN with the ANN associated with the particular community engine. The replaced master ANN can be archived for potential future use.

In some examples, the system monitors the accuracy of each of the master ANN engine and the community engines to determine whether their associated ANNs are being overtrained. For instance, the system can identity a given ANN as being overtrained where the accuracy of its associated community engine decreases by more than a threshold amount. Where overtraining occurs, the system can replace the overtrained ANN with a new ANN.

In certain examples, the system includes an archive storing various ANNs previously utilized by the system. The archive can store, for example, previous master ANNs, the most accurate ANNs as evaluated over previous periods of time (e.g., previous day, week, month, year, and/or all-time). In some examples, each of these ANNs can be part of a community, and thus can be continually trained to compete to be a master ANN. For instance, in some examples, each community can include a community engine that is associated with, and trains, an ANN that is a copy of a master ANN of another community. For ease of reference, a community engine that is associated with a copy of a master ANN from another community is referred to herein as a peer engine. These peer engines, like other members of the community, train their ANNs to compete to become the master ANN of the community in which they reside. In this way, the systems described herein can combine master ANNs within a single community to help evolve adaptive bot detectors to higher levels of accuracy.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Adaptive Bot Detection System

In some examples, an adaptive bot detection service is configured to identify attempts by bots to interoperate with one or more other services provided by a computer system. FIG. 1 illustrates a logical architecture of a network computing platform 100 that implements services in accordance with these examples. As shown, FIG. 1 includes a plurality of bots 102A-102N and a plurality of clients 104A-104N that are configured to interoperate with the platform 100 via a network 108. The platform 100 implements a plurality of protected services 106A-106N. The protected services 106A-106N include services 116A-116N, adaptive bot detectors 118A-118N, and bot verifiers 114A-114N. Each of the adaptive bot detectors 118A-118N is configured to interoperate with an ANN archive 112 via a trusted network 110. The ANN archive is configured to store a plurality of ANNs 120A-120N. For ease of reference, each of the bots 102A-102N, the clients 104A-104N, the protected services 106A-106N, the bot verifiers 114A-114N, the services 116A-116N, the adaptive bot detectors 118A-118N, and the ANNs 120A-120N may be referred to collectively as the bots 102, the clients 104, the protected services 106, the bot verifiers 114, the services 116, the adaptive bot detectors 118, and the ANNs 120. Individual members of these collectives may be referred to generically as the bot 102, the client 104, the protected service 106, the bot verifier 114, the service 116, the adaptive bot detector 118, and the ANN 120.

In certain examples, each protected service 106 includes a service 116, an adaptive bot detector 118, and a bot verifier 114. The service 116 is configured to interoperate with a client 104 via the network 108 and an interface exposed and implemented by the service 116. For instance, in some examples, the service 116 includes a web server that exposes and implements a hypertext transfer protocol (HTTP) interface configured to receive HTTP requests and to transmit HTTP responses to the received HTTP requests via the network 108. In these examples, the clients 104 can include browsers configured to transmit the HTTP requests and to receive the HTTP responses via the network 108. Alternatively or additionally, in some examples, the service 116 includes a web service endpoint that exposes and implements a web service application program interface (API) configured to receive web service requests and to transmit web service responses via the network 108. In these examples, the clients 104 can include web service clients configured to transmit the web service requests and to receive the web service responses via the network 108. Other types of request and response messages can be exchanged by the clients 104 and the services 116 according to the examples disclosed herein.

Regardless of the type of requests received, the service 116 can be configured to process the requests to perform a service useful to the client 104 prior to transmitting responses. In some examples, responses include one or more results of the processing performed responsive to the received requests. For instance, where a request is an HTTP request, a response may include, for example, a hypertext markup language (HTML) form that can be rendered by the client 104 so that a user can interact with the client 104 via the form.

Figure 2:
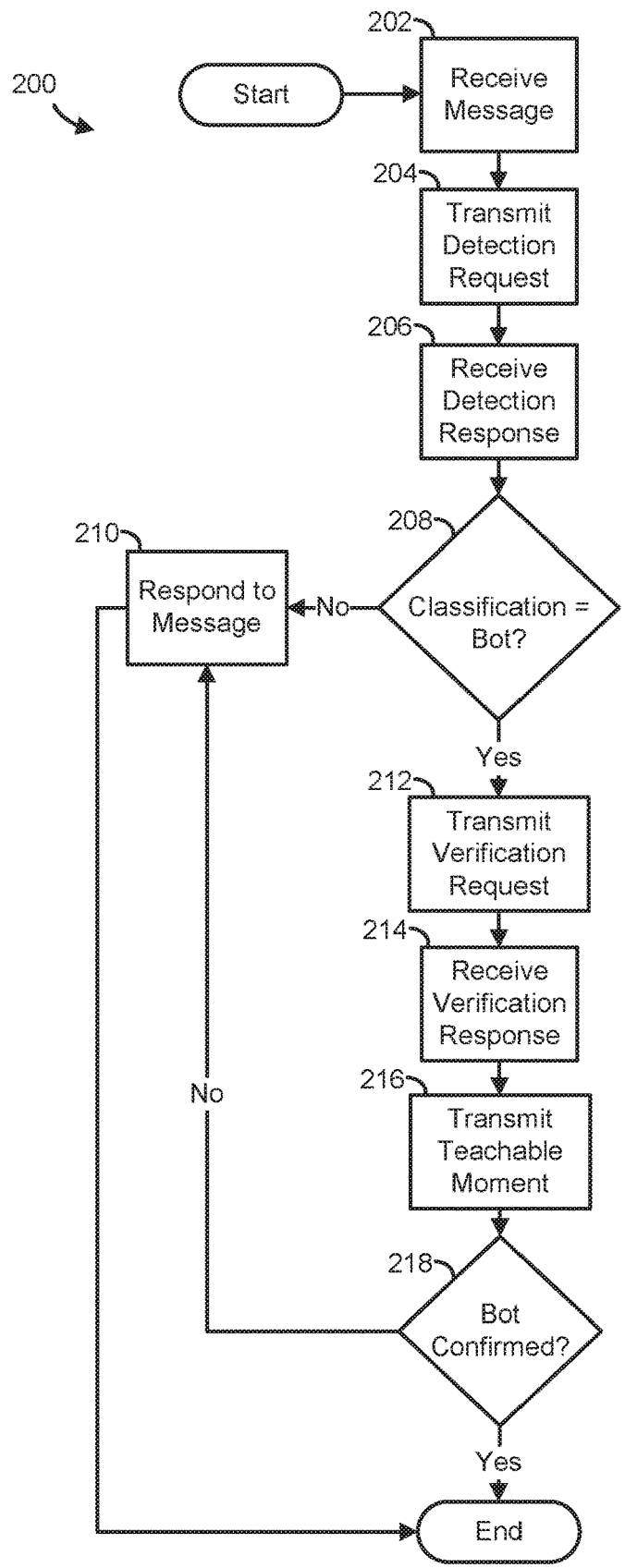
FIG. 2 is a flow diagram of an interoperative process executed by a protected service in accordance with an example of the present disclosure.

In some examples, the service 116 is configured to interoperate with the adaptive bot detector 118 while interoperating with an ostensible client (e.g., a bot 102 or a client 104). In these examples, the protected service 106 is configured to avoid processing requests from an ostensible client that is, in reality, a bot 102. FIG. 2 illustrates one instance of an interoperative process 200 that the protected service 106 is configured to execute and/or executes in these examples.

As shown in FIG. 2, the process 200 starts with a service (e.g., the service 116 of FIG. 1) receiving 202 a message from an ostensible client. For example, the service can receive a message requesting to access a resource (e.g., a file) provided by the service. In response to reception of the message, the service transmits 204 a detection request to an adaptive bot detector (e.g., the adaptive bot detector 118 of FIG. 1). The adaptive bot detector receives the detection request, generates a detection response by executing message handling and detection processes described further below with reference to FIGS. 3-7, and returns the detection response to the service. The service receives 206 the detection response. The service parses the detection response and determines 208 whether the detection response indicates that the ostensible client is a bot (e.g., a bot 102 of FIG. 1) or a client (e.g., a client 104 of FIG. 1).

Where the service determines 208 that the detection response indicates that the ostensible client is a client, the service completes processing of the message and responds 210 to the message, and the process 200 ends. In some examples, the service responds 210 to the message by executing various processes and transmitting a message related to results of the various processes to the verified client. For example, where the message received 202 includes an HTTP request, the message related to the results of the various processes can include an HTTP response.

Continuing the process 200, where the service determines 208 that the detection response indicates that the ostensible service is a bot, the service suspends further interoperation with the ostensible client and transmits 212 a verification request to a bot verifier (e.g., the bot verifier 114 of FIG. 1). In response to reception of the verification request, the bot verifier issues a challenge (e.g., a CAPTCHA challenge) to the ostensible client, confirms whether or not the ostensible client is a bot, and transmits a verification response to the service.

Continuing the process 200, the service receives 214 the verification response and transmits 216 a message including a teachable moment to the adaptive bot detector. The teachable moment includes the verification response (e.g., a bot/no-bot determination) and information (e.g., parameters) associated with the service request that is useful for bot detection. In web-based examples, the information useful for bot detection can include total number of requests, total number of session bytes, total HTTP GET requests, total HTTP POST requests, total HEAD requests, percentage of HTTP requests that lead to an HTTP 3xx code response, percentage of HTTP requests that lead to an HTTP 4xx code response, percentage of image requests, percentage of pdf requests, percentage of cascading style sheets (CSS) file requests, percentage of JavaScript requests, HTML-to-image ratio, percentage of requests with no referrers, whether or not the session included a search engine refer, whether or not the session included an unknown refer, standard deviation of requested page depth, maximum requests per page, average requests per page, maximum number of consecutive sequential HTTP requests, percentage of consecutive sequential HTTP requests, session time, browsing speed, and standard deviation of inter-request times. Further, in certain examples, the information useful for bot detection can include a source internet protocol (IP) address, a destination IP address, a source port, a destination port, a protocol, a total number of packets exchanged, a total number of null packets exchanged, a percentage of small (e.g., less than 100 bytes) packets exchanged, a ratio of inbound packets to outbound packets, number of reconnects, flow duration, length of first packet, total bytes transferred, standard deviation of payload length, average bits per second, average packets per second, average inter arrival time of packets, average time between mouse clicks, and ratio of images to text. In some examples, the information useful for bot detection can include an array of packet count percentages in which each element is a number of packets that fall within a packet size range (e.g., less than 100 bytes, between 101 and 110 bytes, between 111-120 bytes, etc.) associated with the element divided by the total number of packets. The number of elements in this array and the range of sizes associated with each element can vary between examples. The service determines 218 whether the verification response confirms that the ostensible client is a bot. Where the service determines 218 that the verification response confirms the ostensible client is a bot, the process 200 ends. Where the service determines 218 that the verification response indicates that the ostensible client is an actual client, the service resumes interoperation with the verified client, completes processing of the message, responds 210 to the message, and the process 200 ends.

Figure 3:
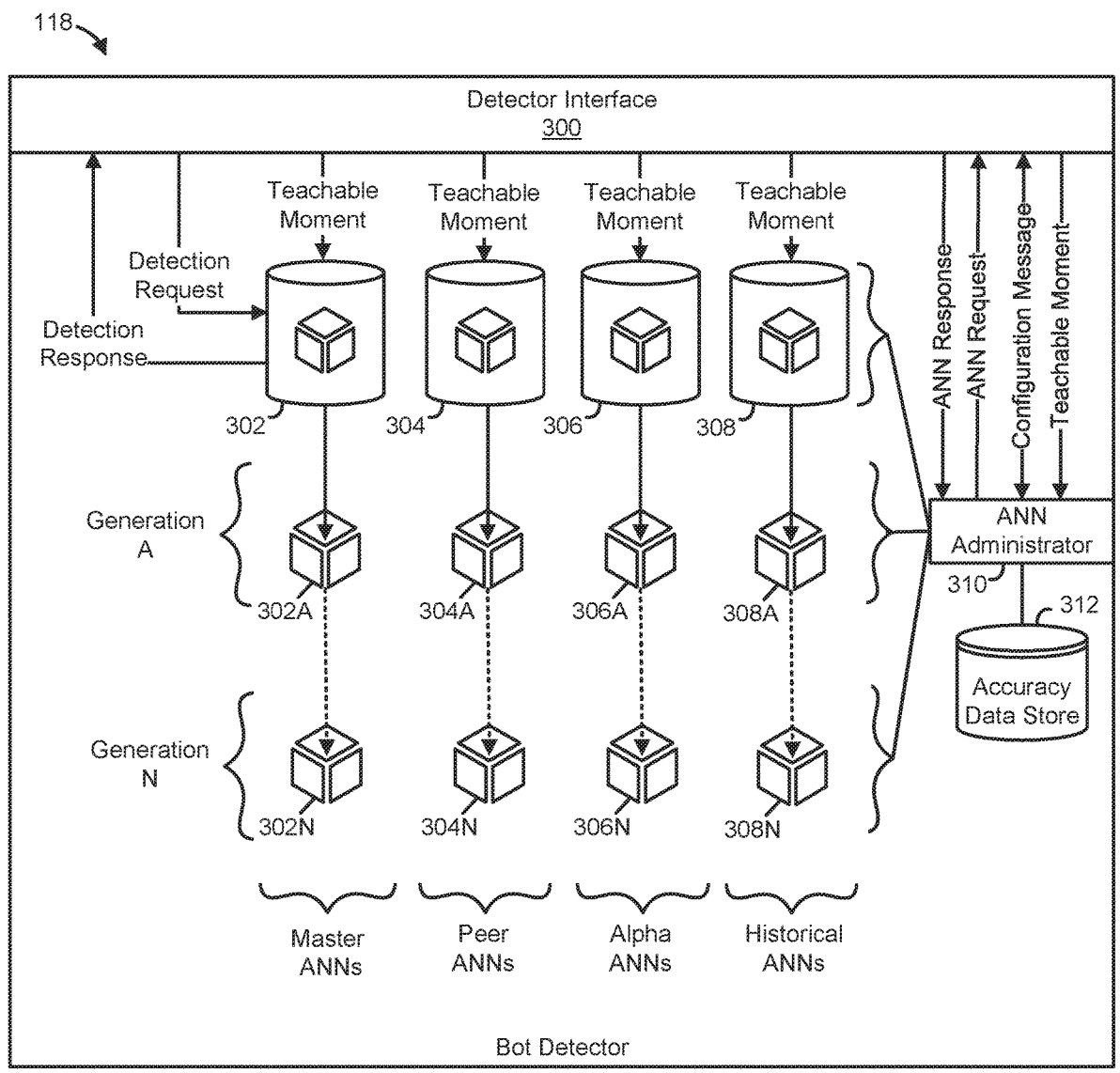
FIG. 3 is a block diagram of an adaptive bot detector in accordance with an example of the present disclosure.

Returning to FIG. 1, the adaptive bot detector 118 is configured to monitor messages exchanged between the service 116 and an ostensible client during their interoperation with one another to determine whether the ostensible client is a client 104 or a bot 102. In some examples, the adaptive bot detector is configured to make these determinations without interacting directly with the ostensible client. Further, in some examples, the adaptive bot detector 118 is configured to improve its accuracy in making these determinations over time. FIG. 3 illustrates the logical architecture of the adaptive bot detector 118 according to some examples. As shown in FIG. 3, the adaptive bot detector 118 includes and implements a detector interface 300, ANN engines 302-308, an ANN administrator 310, an accuracy data store 312, and, over time, multiple generations of ANNs 302A-308N. The ANN engines 302-308 includes a master ANN engine 302, a peer ANN engine 304, an alpha ANN engine 306, and a historical ANN engine 308. Additional ANN engines can be included in some examples. For ease of reference, the ANN engines 304-308 may be referred to collectively as the community engines. Each of the ANN engines 302-308 is associated with and utilizes an ANN from the current generation. The current generation varies over time, as the ANN administrator 310 evaluates and reconfigures the current generation of ANNs based on results of the evaluations. For example, upon completion of initialization, each of the ANN engines 302-308 is associated with and utilizes its corresponding ANN from generation A (the ANNs 302A-308A) but over time is eventually associated with and utilizes is corresponding ANN from generation N (the ANNs 302N-308N). The evaluation and reconfiguration processes executed by the ANN administrator 310 are described in detail below.

In some examples, each of the ANNs 302A-308N has a set of input nodes with transfer functions that are configured to receive a set of parameters useful for bot detection. Each member of this set of parameters has a predefined data type and range of values. Examples of parameters useful for bot detection are described further below. Further, in some examples, each of the ANNs 302A-308N has an set of output nodes configured to provide output that indicates a level of confidence that an ostensible client is either a bot or a client. The set of input nodes is connected to the set of output nodes by one or more intermediate layers. The set of input nodes and/or the set of output nodes for each of the ANNs 302A-308N can be identical.

Figure 4:
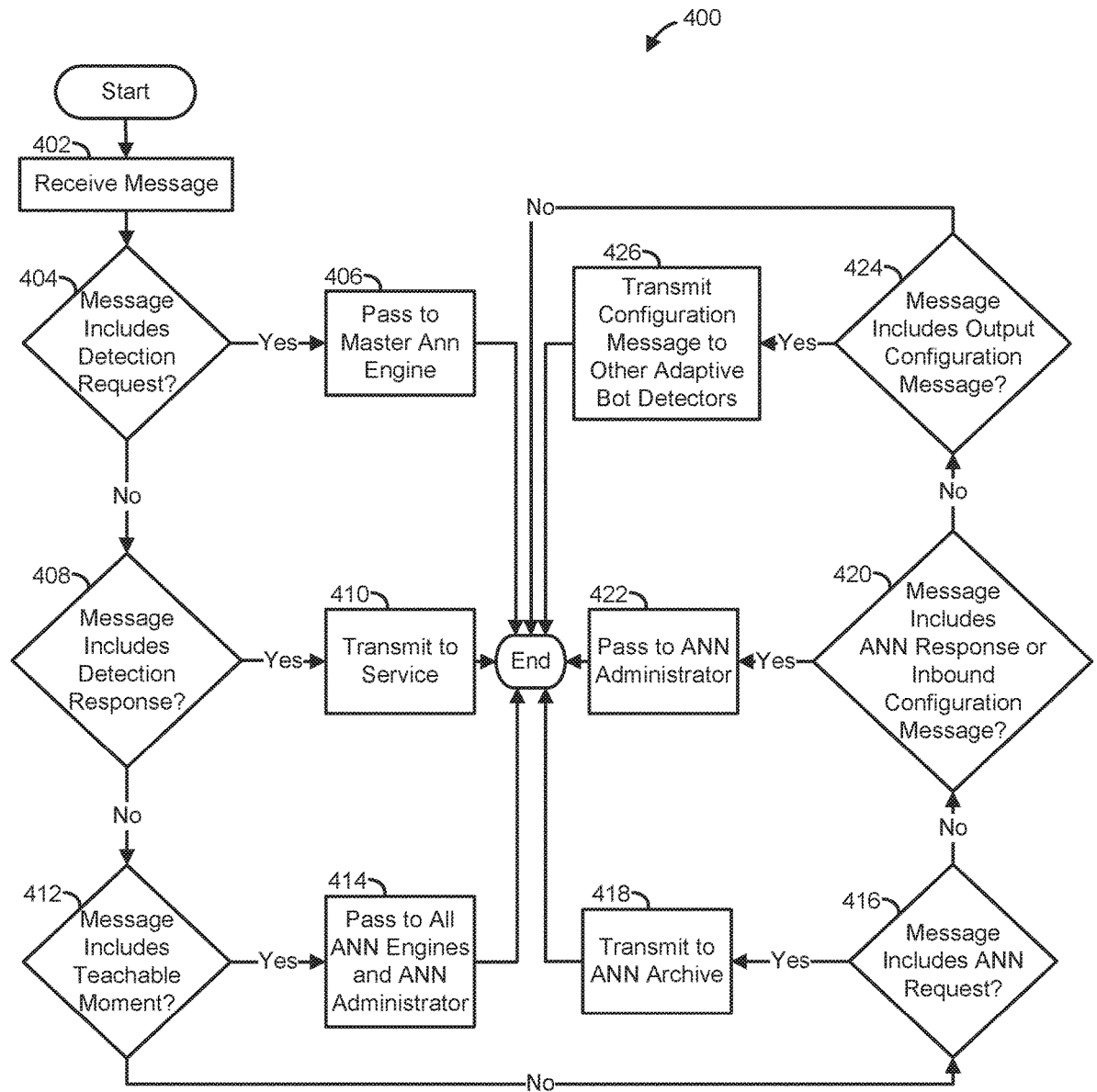
FIG. 4 is a flow diagram of a message handling process executed by a detector interface in accordance with an example of the present disclosure.

As shown in FIG. 3, the detector interface 300 is configured to expose and implement an interface configured to receive, parse, validate, handle, and respond to messages including function calls addressed to the adaptive bot detector 118. The detector interface 300 can, for example, be implement as a web service interface, although other types of system interfaces can be used in various examples. In some examples, the detector interface 300 is configured to process messages including detection requests, detection responses, teachable moments, ANN requests, ANN responses, and configuration messages. FIG. 4 illustrates a message handling process 400 that the detector interface 300 is configured to execute and/or executes in these examples.

As shown in FIG. 4, the process 400 starts with the detector interface receiving 402 a message. This message can be received from an external process, such as a service (e.g., the service 116 of FIG. 1). Alternatively or additionally, the message can be generated by a process (e.g., the master ANN engine 302 of FIG. 3, the ANN administrator 310 of FIG. 3, etc.) internal to the adaptive bot detector (e.g., the adaptive bot detector 118 of FIG. 1) that implements the detector interface. In response to receiving the message, the detector interface parses the message and determines 404 whether the message includes a detection request received from a service.

Where the detector interface determines 404 that the message includes a detection request, the detector interface passes 406 the detection request to the master ANN engine for subsequent processing, and the process 400 ends. Where the detector interface determines 404 that the message does not include a detection request, the detector interface determines 408 whether the message includes a detection response received from the master ANN engine.

Where the detector interface determines 408 that the message includes a detection response, the detector interface transmits 410 the detection response to the service addressed by the detection response for subsequent processing, and the process 400 ends. In some examples, the service addressed by the detection response is the service that previously transmitted a corresponding detection request to the detector interface. Where the detector interface determines 408 that the message does not include a detection response, the detector interface determines 412 whether the message includes a teachable moment received from the service.

Where the detector interface determines 412 that the message includes a teachable moment, the detector interface passes 414, for subsequent processing, the teachable moment to an ANN administrator (e.g., the ANN administrator 310 of FIG. 3) and all ANN engines (e.g., the ANN engines 302-308 of FIG. 3) within the adaptive bot detector (e.g., the adaptive bot detector 118A of FIG. 1) that hosts the detector interface, and the process 400 ends. Where the detector interface determines 412 that the message does not include a teachable moment, the detector interface determines 416 whether the message includes an ANN request received from an ANN administrator (e.g., the ANN administrator 310 of FIG. 3).

Where the detector interface determines 416 that the message includes an ANN request, the detector interface transmits 418 the ANN request to an ANN archive (e.g., the ANN archive 112 of FIG. 1) for subsequent processing, and the process 400 ends. Where the detector interface determines 416 that the message does not include an ANN request, the detector interface determines 420 whether the message includes an ANN response received from the ANN administrator or an inbound configuration message received from another adaptive bot detector (e.g., the adaptive bot detector 118B-118N of FIG. 1).

Where the detector interface determines 420 that the message includes an ANN response or an inbound configuration message, the detector interface transmits 422 the ANN response or the inbound configuration message to the ANN administrator for subsequent processing, and the process 400 ends. Where the detector interface determines 420 that the message does not include an ANN response or an inbound configuration message, the detector interface determines 424 whether the message includes an outbound configuration message received from the ANN administrator.

Where the detector interface determines 424 that the message includes an outbound configuration message, the detector interface transmits 426 the outbound configuration message to the one or more other adaptive bot detectors for subsequent processing, and the process 400 ends. In some examples, the detector interface transmits the outbound configuration message to adaptive bot detectors that host a peer engine that is associated with, and that trains, an ANN that is a copy of the master ANN local to the detector interface. Where the detector interface determines 424 that the message does not include an outbound configuration message, the process 400 ends.

Figure 5:
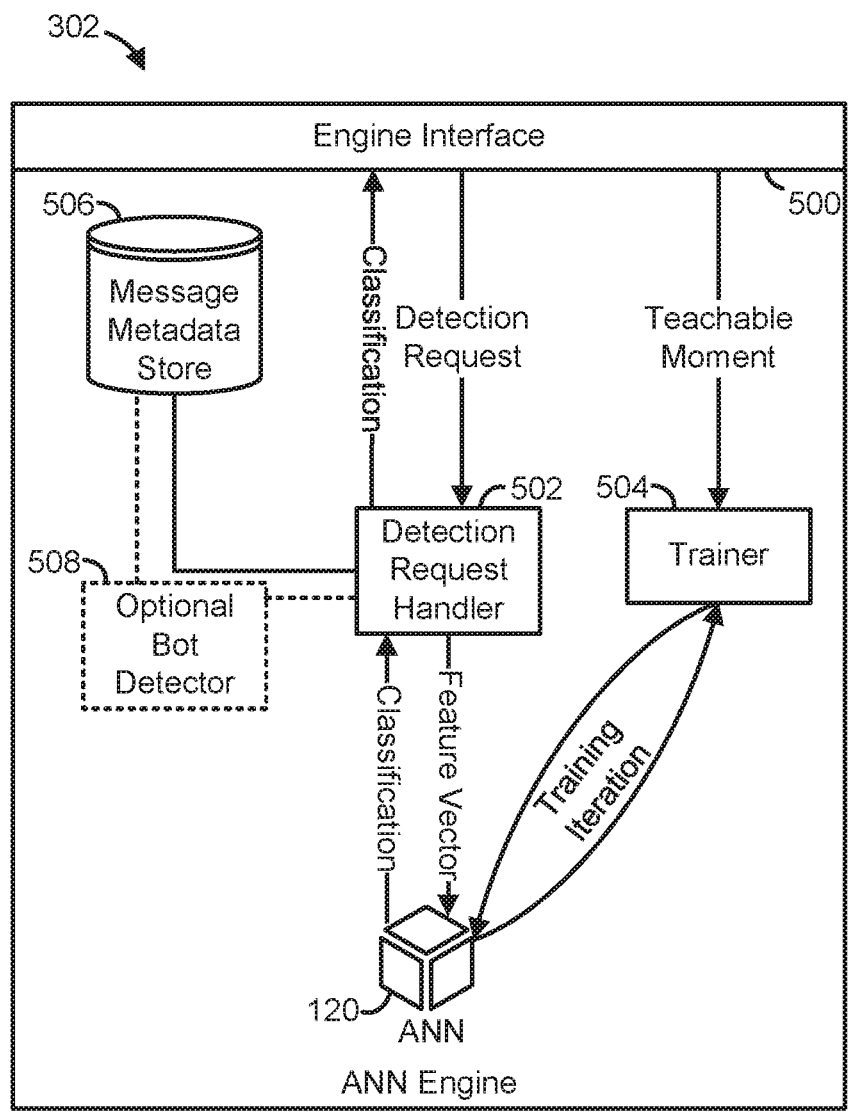
FIG. 5 is a block diagram of an artificial neural network (ANN) engine in accordance with an example of the present disclosure.

Returning to FIG. 3, a master ANN engine (e.g. the master ANN engine 302) is configured to receive and process a detection request to generate and pass a detection response to the detector interface 300. This detection response indicates whether an ostensible client subject to the detection request is a client (e.g., a client 104 of FIG. 1) or a bot (e.g., a bot 102 of FIG. 1). FIG. 5 illustrates the logical architecture of the master ANN engine 302 according to some examples. As shown in FIG. 5, the master ANN engine 302 includes and implements an engine interface 500, a detection request handler 502, a trainer 504, a message metadata store 506, an ANN 120, and an optional bot detector 508. Some of the optional features of the master ANN engine 302 are illustrated in FIG. 5 using dashed lines. It should be noted that the community engines can have the same architecture as the master ANN engine, although this is not a requirement.

Figure 6:
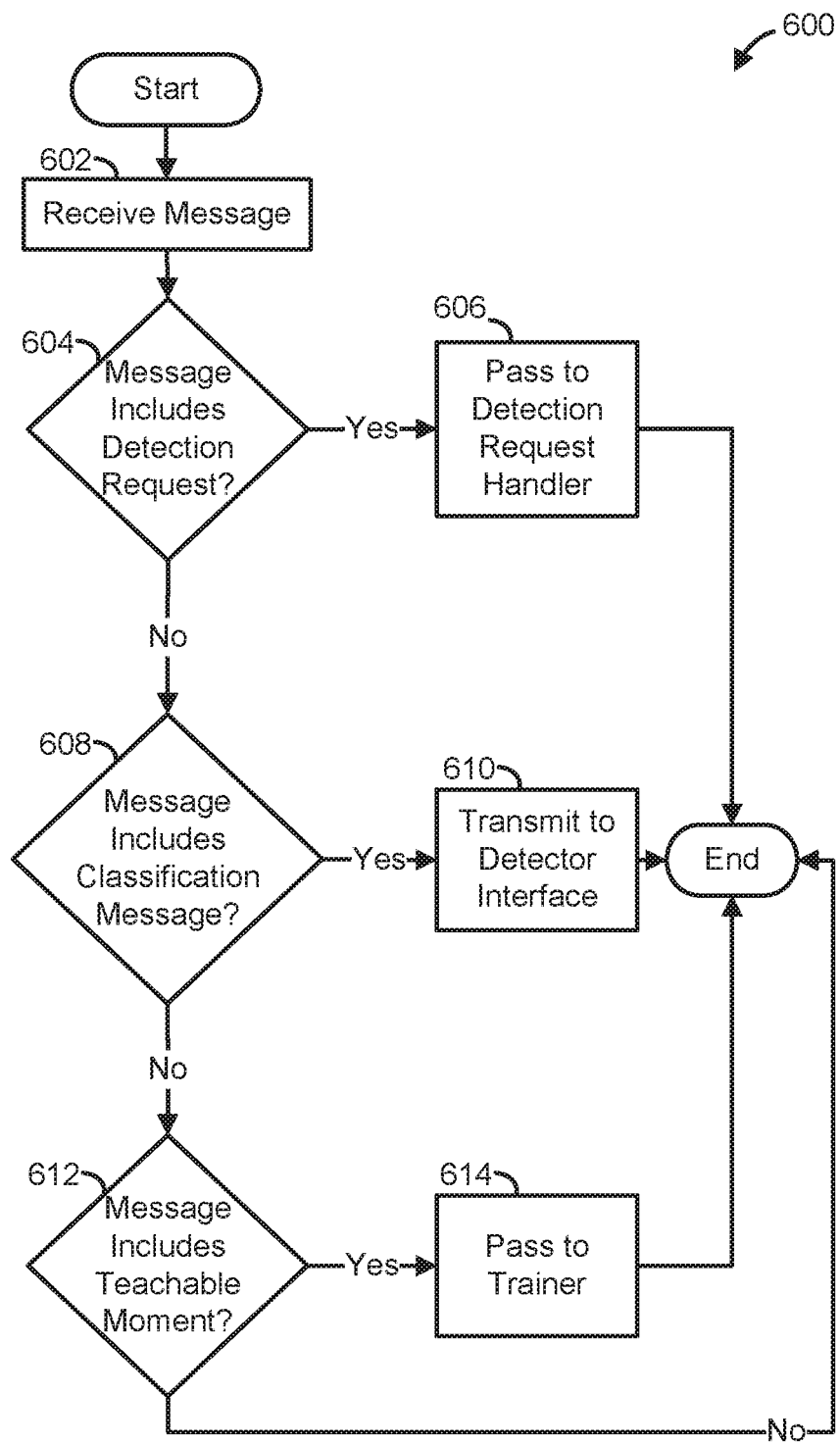
FIG. 6 is a flow diagram of a message handling process executed by an engine interface in accordance with an example of the present disclosure.

As shown in FIG. 5, the engine interface 500 is configured to expose and implement an interface configured to receive, parse, validate, handle and respond to messages including function calls addressed to the master ANN engine 302. The engine interface 500 can, for example, be implement as a web service interface, although other types of system interfaces can be used in various examples. In some examples, the engine interface 500 is configured to process messages including detection requests, classification messages, and teachable moments. FIG. 6 illustrates a message handling process 600 that the engine interface 500 is configured to execute and/or executes in these examples.

As shown in FIG. 6, the process 600 starts with the engine interface receiving 602 a message. This message can be received from an external process, such as a detector interface (e.g., the detector interface 300 of FIG. 3). Alternatively or additionally, the message can be generated by a process (e.g., the detection request handler 502 of FIG. 5, etc.) internal to the master ANN engine. In response to receiving the message, the engine interface parses the message and determines 604 whether the message includes a detection request received from the detector interface.

Where the engine interface determines 604 that the message includes a detection request, the engine interface passes 606 the detection request to a detection request handler (e.g., the detection request handler 502 of FIG. 5) for subsequent processing, and the process 600 ends. Where the engine interface determines 604 that the message does not include a detection request, the engine interface determines 608 whether the message includes a classification message received from the detection request handler.

Where the engine interface determines 608 that the message includes a classification message, the engine interface generates and transmits 610 a detection response including the classification to the detector interface for subsequent processing, and the process 600 ends. Where the engine interface determines 608 that the message does not include a classification message, the engine interface determines 612 whether the message includes a teachable moment received from the detector interface.

Where the engine interface determines 612 that the message includes a teachable moment, the engine interface passes 614 the teachable moment to a trainer (e.g., the trainer 504 of FIG. 5) for subsequent processing, and the process 600 ends. Where the engine interface determines 612 that the message does not include a teachable moment, the process 600 ends.

Figure 7:
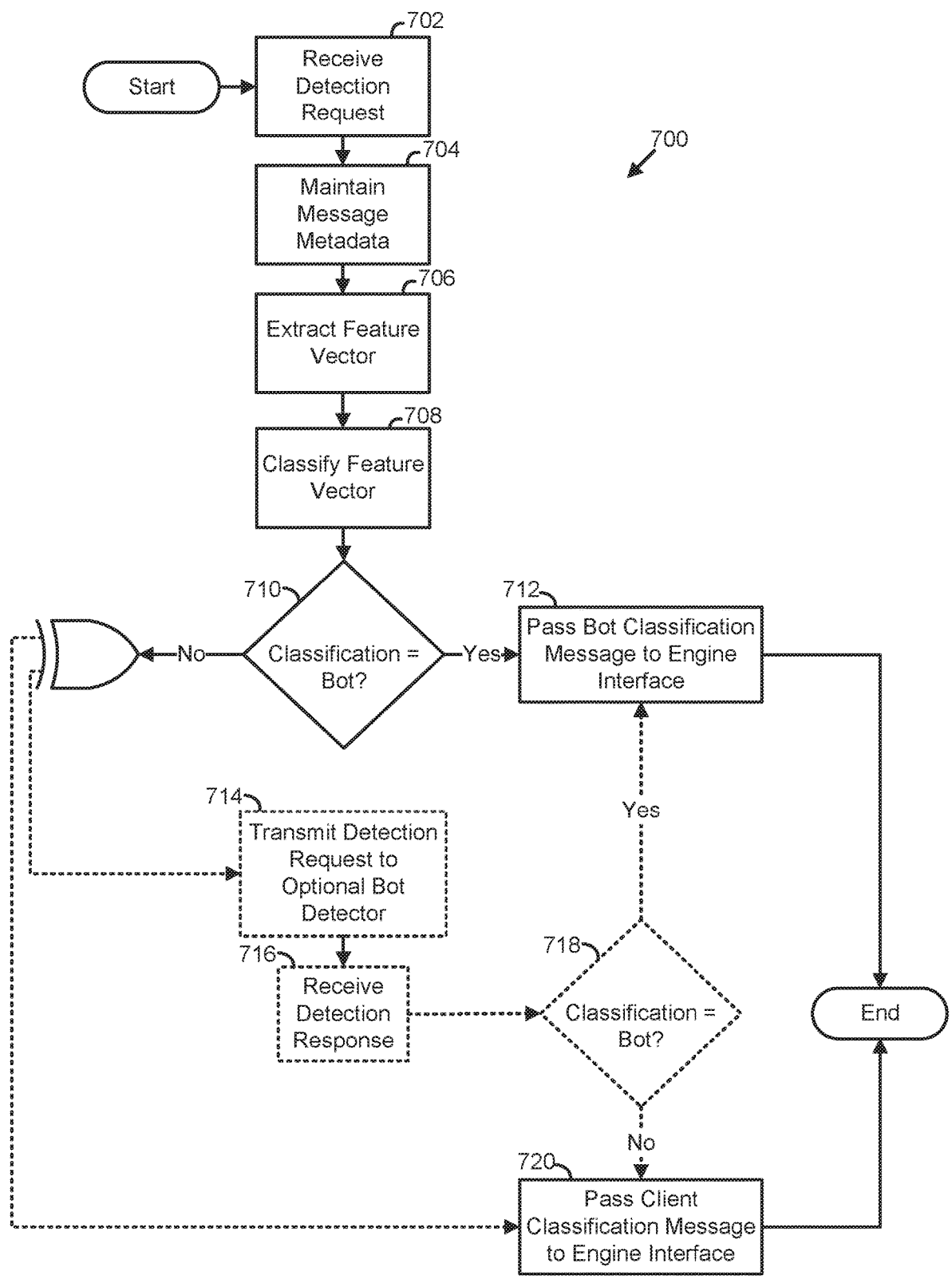
FIG. 7 is a flow diagram of a classification process executed by an ANN engine in accordance with an example of the present disclosure.

Returning to FIG. 5, the detection request handler 502 is configured to receive and process a detection request to generate and pass a classification message to the engine interface 500. This classification message indicates whether an ostensible client subject to the detection request is a client (e.g., a client 104 of FIG. 1) or a bot (e.g., a bot 102 of FIG. 1). FIG. 7 illustrates a classification process 700 that the detection request handler 502 is configured to execute and/or executes in some examples. Some of the optional operations of the process 700 are illustrated in FIG. 7 using dashed lines.

As shown in FIG. 7, the process 700 starts with the detection request handler receiving 702 a detection request. The detection request handler parses the detection request and analyzes the data stored therein to maintain 704 a message metadata store (e.g., the message metadata store 506 of FIG. 5). For instance, in some examples, the message metadata store is configured to store metadata regarding messages exchanged between a service (e.g., the service 116 of FIG. 1) and each ostensible client that interoperates with the service. In these examples, the detection request handler maintains the currency of the metadata within the metadata data store. This metadata can include, for each ostensible client, one or more of the following elements: total number of requests, total number of session bytes, total HTTP GET requests, total HTTP POST requests, total HEAD requests, percentage of HTTP requests that lead to an HTTP 3xx code response, percentage of HTTP requests that lead to an HTTP 4xx code response, percentage of image requests, percentage of pdf requests, percentage of CSS file requests, percentage of JavaScript requests, HTML-to-image ratio, percentage of requests with no referrers, whether or not the session included a search engine refer, whether or not the session included an unknown refer, standard deviation of requested page depth, maximum requests per page, average requests per page, maximum number of consecutive sequential HTTP requests, percentage of consecutive sequential HTTP requests, session time, browsing speed, and standard deviation of inter-request times. Alternatively or additionally, this metadata can include, for each ostensible client, one or more of the following elements: a source internet protocol (IP) address, a destination IP address, a source port, a destination port, a protocol, a total number of packets exchanged, a total number of null packets exchanged, a percentage of small packets exchanged, a ratio of inbound packets to outbound packets, number of reconnects, flow duration, length of first packet, total bytes transferred, standard deviation of payload length, average bits per second, average packets per second, average inter arrival time of packets, average time between mouse clicks, and ratio of images to text, among other elements of metadata. It should be noted that, in some examples, greater or few elements of metadata can be maintained in the message metadata store, depending on the configuration of the input nodes of the ANN 120.

Continuing with the process 700, detection request handler extracts 706 a feature vector representative of interoperations between the service and the ostensible client subject to the detection request. The particular features of the vector and their associated calculations vary depending on the architecture of the ANN 120, but in general, this feature vector includes information (e.g., parameters) useful for bot detection and is tailored to match the input nodes of the ANN 120.

Continuing the process 700, the detection request handler next classifies 708 the feature vector by, for example, applying the ANN 120 to the feature vector (e.g., by supplying the members of the feature vector to corresponding input nodes of the ANN 120). The detection request handler determines 710 whether the ostensible client is a client (e.g., a client 104 of FIG. 1) or a bot (a bot 102 of FIG. 1). For example, the detection request handler can determine 710 that the ostensible client is a client where output of the ANN classifies the feature vector as belonging to a client class with a confidence that exceeds a threshold value and can otherwise classify the feature vector as belonging to a bot class. Where the detection request handler determines 710 that the ostensible client is a bot, the detection request handler generates and passes 712, to an engine interface (e.g., the engine interface 500 of FIG. 5), a classification message indicating that the ostensible client is classified as a bot, and the process 700 ends.

Where the detection request handler determines that the ostensible client is a client, the detection request handler optionally transmits 714 a detection request to an optional bot detector (e.g., the optional bot detector 508 of FIG. 5). For instance, in some examples, the detection request can include a flag that indicates whether the optional bot detector may be invoked. The optional bot detector can, for example, execute other types (e.g., statistical, heuristic, and/or machine learning) of bot detection processes to generate and transmit a detection response to the detection request handler. Therefore, the information useful for bot detection included in the detection request to the optional bot detector can differ from the information included in the feature vector supplied to the ANN. Additionally, in some examples, the optional bot detector can be configured to randomly or periodically indicate that the ostensible client is a bot, regardless of the parameters included in the detection request. This configuration can be helpful in detecting new bot variants, as described above.

Continuing the process 700, the detection request handler receives 716 and parses a detection response from the optional bot detector and determines 718 whether the detection response indicates that the ostensible client is a bot. Where the detection request handler determines 718 that the ostensible client is a bot, the detection request handler generates and passes 712, to the engine interface, a classification message indicating that the ostensible client is classified as a bot, and the process 700 ends. Where the detection request handler determines 718 that the ostensible client is a client, the detection request handler generates and passes 720, to the engine interface, a classification message indicating that the ostensible client is classified as a client, and the process 700 ends.

Figure 8:
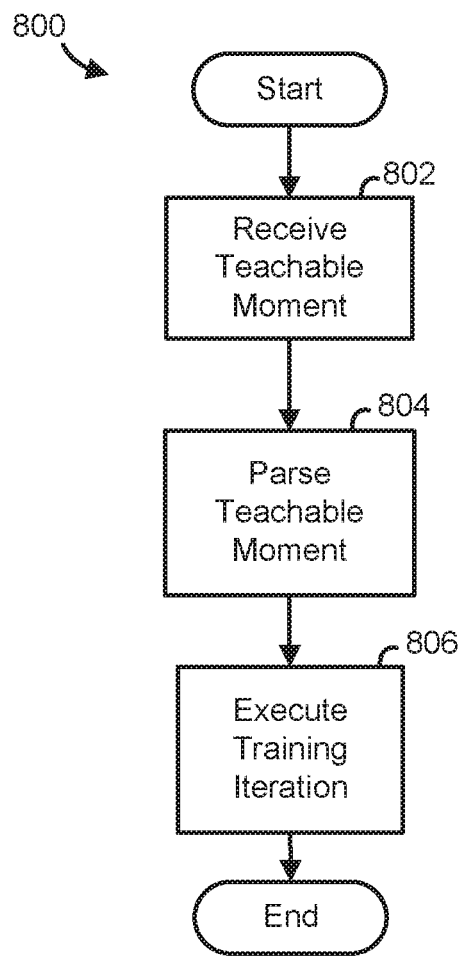
FIG. 8 is a flow diagram of a training process executed by an ANN engine in accordance with an example of the present disclosure.

Returning to FIG. 5, the trainer 504 is configured to receive teachable moments and to use the ground truth and information useful for bot detection stored therein to execute an iterative training process. FIG. 8 illustrates a training process 800 that the trainer 504 is configured to execute and/or executes in some examples.

As shown in FIG. 8, the process 800 starts with the trainer receiving 802 a teachable moment from an engine interface (e.g., the engine interface 500 of FIG. 5). The trainer parses 804 the teachable moment to retrieve a set of parameters relevant to bot detection and ground truth information generated by the CAPTCHA challenge (bot/no-bot determination) stored therein. The set of parameters can include, for example a feature vector classified by an ANN as being either a client (e.g. the client 104 of FIG. 1) or a bot (e.g., the bot 102 of FIG. 1) as recorded in the ground truth information. Next, the trainer executes 806 a training iteration on an ANN (e.g., the ANN 120 of FIG. 5) using the set of parameters and the ground truth information, and the process 800 ends.

Figure 9:
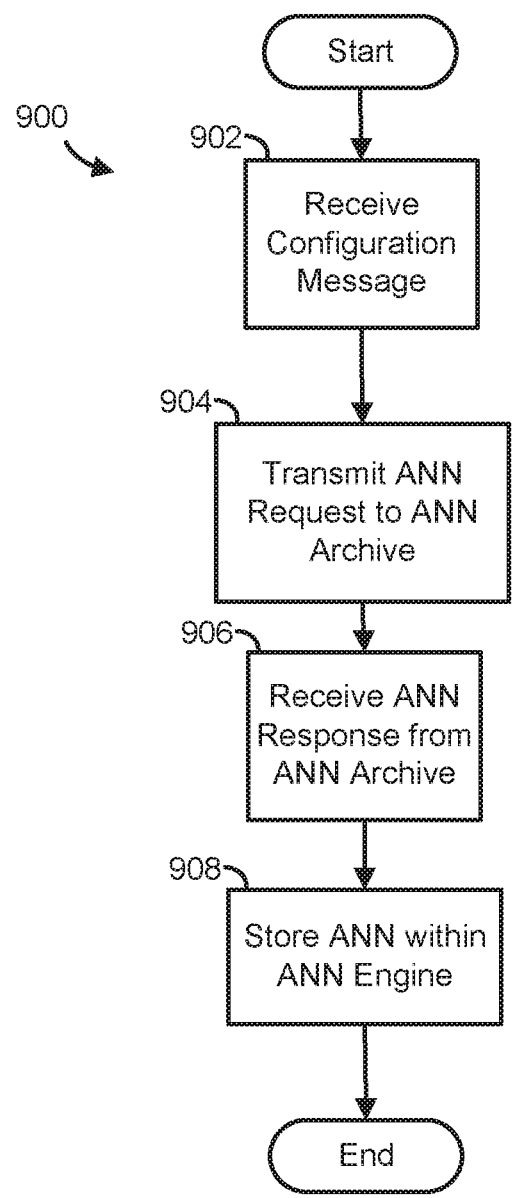
FIG. 9 is a flow diagram of a configuration process executed by an ANN administrator in accordance with an example of the present disclosure.

Returning to FIG. 3, the ANN administrator 310 is configured to initialize and maintain the ANNs utilized by community engines and the master ANN engine 302. In some examples, the ANN administrator 310 accomplishes these objectives, in part, by exchanging configuration messages with an ANN archive (e.g., the ANN archive 112 of FIG. 1) via the detector interface 300. FIG. 9 illustrates a configuration process 900 that the ANN administrator 310 is configured to execute and/or executes in these examples.

As shown in FIG. 9, the process 900 starts with the ANN administrator receiving 902 a configuration message from a detector interface (e.g. the detector interface 300 of FIG. 3). The configuration message can include associations between one or more ANN engines (e.g., one or more of the ANN engines 302-308 of FIG. 3) and one or more ANNs (e.g., one or more of the ANNs 120A-120N of FIG. 1) stored in an ANN archive (e.g., the ANN archive 112 of FIG. 1). These configuration messages can be received during initialization of the platform of which the ANN administrator is a part (e.g., the platform 100 of FIG. 1) and/or in response to promotion of an ANN within an adaptive bot detector other than the adaptive bot detector hosting the ANN administrator (e.g., one or more of the adaptive bot detectors 118B-118N of FIG. 1).

For instance, in some examples, during initialization and construction of the platform, the ANN administrator receives 902 a configuration message that associates a master ANN engine (e.g., the master ANN engine 302) with a master ANN stored in the ANN archive. This archived master ANN can be, for example, a master ANN from a previous instance of the adaptive bot detector (e.g., the adaptive bot detector 118A) hosting the ANN administrator. The ANN administrator can also receive 902 a configuration message that associates a peer ANN engine (e.g., the peer ANN engine 304) with another master ANN stored in the ANN archive. This other master ANN can be, for example, a master ANN of peer adaptive bot detector (e.g., the adaptive bot detector 118B of FIG. 1). The ANN administrator can also receive 902 a configuration message that associates an alpha ANN engine (e.g., the alpha ANN engine 306) with an alpha ANN stored in the ANN archive. This alpha ANN can be, for example, an ANN recorded as being the most accurate ANN in the ANN archive. The ANN administrator can also receive 902 a configuration message that associates a historical ANN engine (e.g., the historical ANN engine 308) with a historical ANN stored in the ANN archive. This historical ANN can be, for example, an ANN recorded as being the most accurate ANN in the ANN archive over the last week, month, year, or other selected time period.

In some examples, the ANN administrator can receive 902 a configuration message in response to a promotion of a new ANN to replace the master ANN of the peer adaptive bot detector. In these examples, the configuration message associates the peer ANN engine with the new ANN to initiate its replacement of the current peer ANN.

Continuing the process 900, the ANN administrator transmits 904 one or more ANN requests to the ANN archive via the detector interface. These one or more ANN requests can include one or more identifiers of ANNs specified within previously received configuration messages. In response to reception of ANN requests, the ANN archive transmits the one or more ANNs identified in the one or more ANN requests to ANN administrator via one or more ANN responses. The ANN administrator receives 906 the one or more ANN responses. The ANN administrator next stores 908 the one or more identified ANNs within their associated ANN engine, and the process 900 ends.

Figure 10:
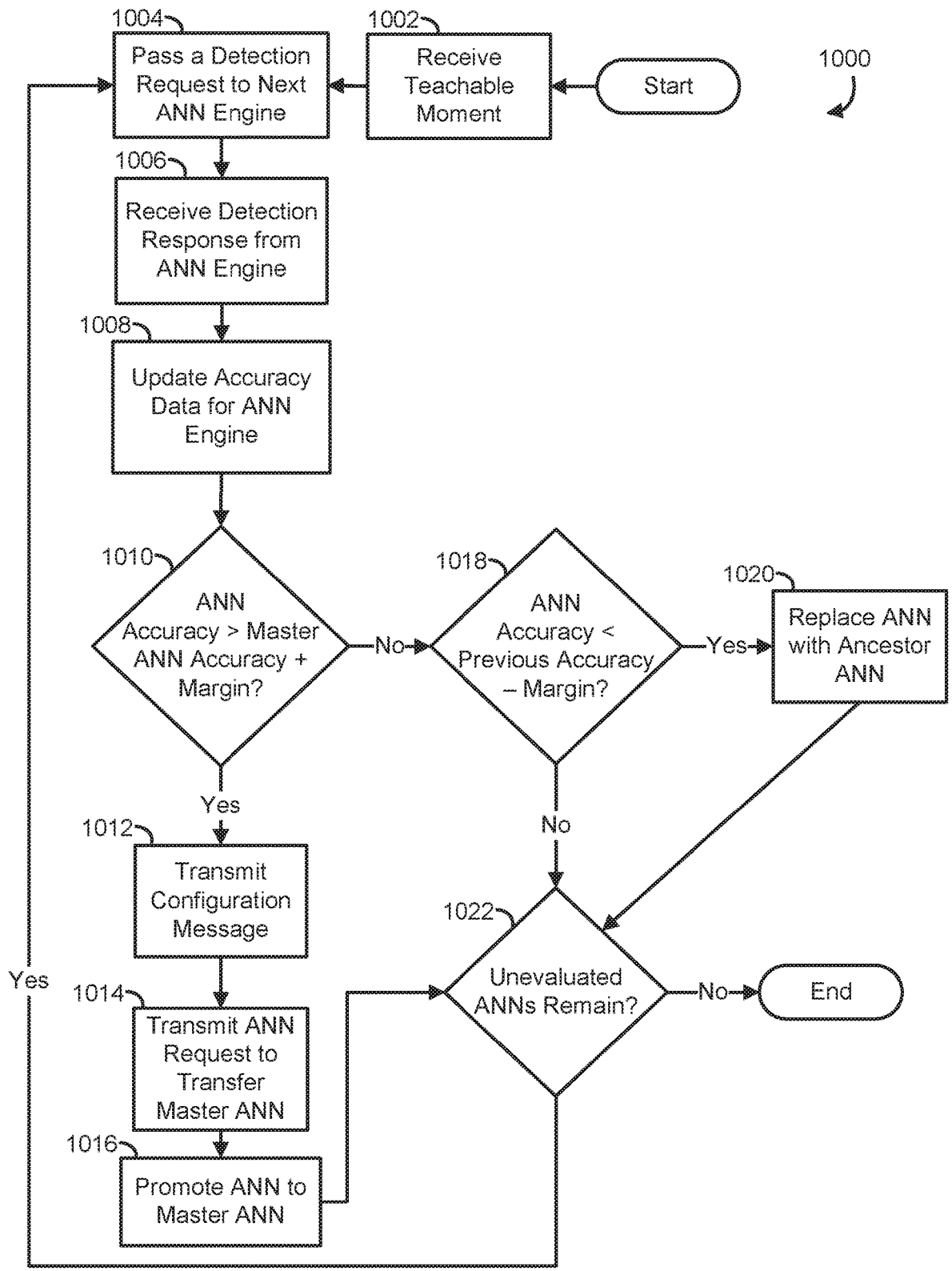
FIG. 10 is a flow diagram of an evaluation and configuration process executed by an ANN administrator in accordance with an example of the present disclosure.

Returning to FIG. 3, the ANN administrator 310 is also configured to evaluate the accuracy of each of a current generation of ANNs utilized by the community engines and the master ANN engine. FIG. 10 illustrates an evaluation and configuration process 1000 that the ANN administrator 310 is configured to execute and/or executes in some examples.

As shown in FIG. 10, the process 1000 starts with the ANN administrator receiving 1002 a teachable moment from a service (e.g., the service 116 of FIG. 1) via a detector interface (e.g. the detector interface 300 of FIG. 3). In response to reception 1002 of the teachable moment, the ANN administrator begins an evaluation loop in which the ANN administrator evaluates each ANN within a generation (e.g., ANN generation A of FIG. 3) currently being utilized by the ANN engines (e.g., the ANN engines 302-308 of FIG. 3) of the adaptive bot detector (e.g., the adaptive bot detector 118A) hosting the ANN administrator.

Continuing the process 1000, the ANN administrator transmits 1004 a detection request to the next ANN engine not evaluated in this instance of the process 1000. The detection request include the parameters relevant to bot detection as specified by (e.g., included in) the teachable moment and a flag indicating that the ANN engine should not utilize any bot detectors other than its currently associated ANN (e.g., a flag indicating that the ANN engine should not utilize an optional bot detector such as the optional bot detector 508 of FIG. 5). In response to reception of the detection request, the ANN engine processes and transmits a detection response (e.g., using processes described above with reference to FIGS. 5-7).

The ANN administrator receives 1006 the detection response and parses it to determine the classification of the ostensible client indicated therein. The ANN administrator compares the classification to the bot/no-bot determination specified by the teachable moment and updates 1008 accuracy information for the ANN stored in an accuracy data store (e.g., the accuracy data store 312 of FIG. 3) based on whether the classification matches the bot/no-bot determination. This accuracy information can include, for example, a percentage of classifications that match the bot/no-bot determination, although other metrics may be included in the accuracy information (e.g., historical trends, etc. . . . ).

Continuing with the process 1000, the ANN administrator determines 1010 whether the ANN accuracy is greater than the sum of accuracy of the master ANN and a configurable margin value. Where the ANN administrator determines 1010 that the ANN accuracy is greater than the sum of accuracy of the master ANN and the configurable margin, the ANN administrator executes a sequence of operations to promote the ANN to replace the master ANN.

For instance, in some examples, the ANN administrator transmits 1012 a configuration message to other adaptive bot detectors that include the master ANN as a peer ANN (e.g., the adaptive bot detectors 118B-118N of FIG. 1) to notify them of the promotion. The ANN administrator also transmits 1014, to an ANN archive (e.g., the ANN archive 112 of FIG. 1) an ANN request to transfer the master ANN to the ANN archive. The ANN administrator also promotes 1016 the ANN to master ANN by storing it as the master ANN (e.g., the master ANN 302N) of a new generation of the ANNs (e.g., generation N of FIG. 5). The ANN administrator can also store new generations of other ANNS in the new generation. In some examples, within the promotion operation 1016, the ANN administrator also replaces the promoted ANN with another ANN internal to the adaptive bot detector or with another historical ANN from the ANN archive.

Continuing the process 1000, the ANN administrator determines 1022 whether ANNs not yet evaluated in this instance of the process 1000 remain. Where the ANN administrator determines that no unevaluated ANNs remain, the process 1000 ends. Where the ANN administrator determines that at least one unevaluated ANN remains, the ANN administrator returns to the operation 1004 and passes 1004 a detection request to the next unevaluated ANN engine.

Returning to the operation 1010, where the ANN administrator determines 1010 that the ANN accuracy is not greater than the sum of accuracy of the master ANN and a configurable margin value, the ANN administrator determines 1018 whether the ANN accuracy is less than a difference between a previous accuracy of the ANN and a configurable margin value. Where the ANN administrator determines 1018 that the ANN accuracy is less than the difference between the previous accuracy of the ANN and the configurable margin value, the ANN administrator replaces 1020 the ANN with an ancestor of the ANN. For instance, with reference to FIG. 3, were the ANN administrator to determine that the accuracy of the ANN 308N was less than a difference between the accuracy of ANN 308A and the configurable margin value, the ANN administrator would record ANN 308N as being overtrained and replace 1020 ANN 308N with ANN 308A. Where the ANN administrator determines 1018 that the ANN accuracy is not less than the difference between the previous accuracy of the ANN and the configurable margin value, the ANN administrator proceeds to the operation 1022.

The processes as disclosed herein each depict one particular sequence of operations in a particular example. Some operations are optional and, as such, can be omitted in accord with one or more examples. Additionally, the order of operations can be altered, or other operations can be added, without departing from the scope of the apparatus and methods described herein.

Computing Device for Adaptive Bot Detection

Figure 11:
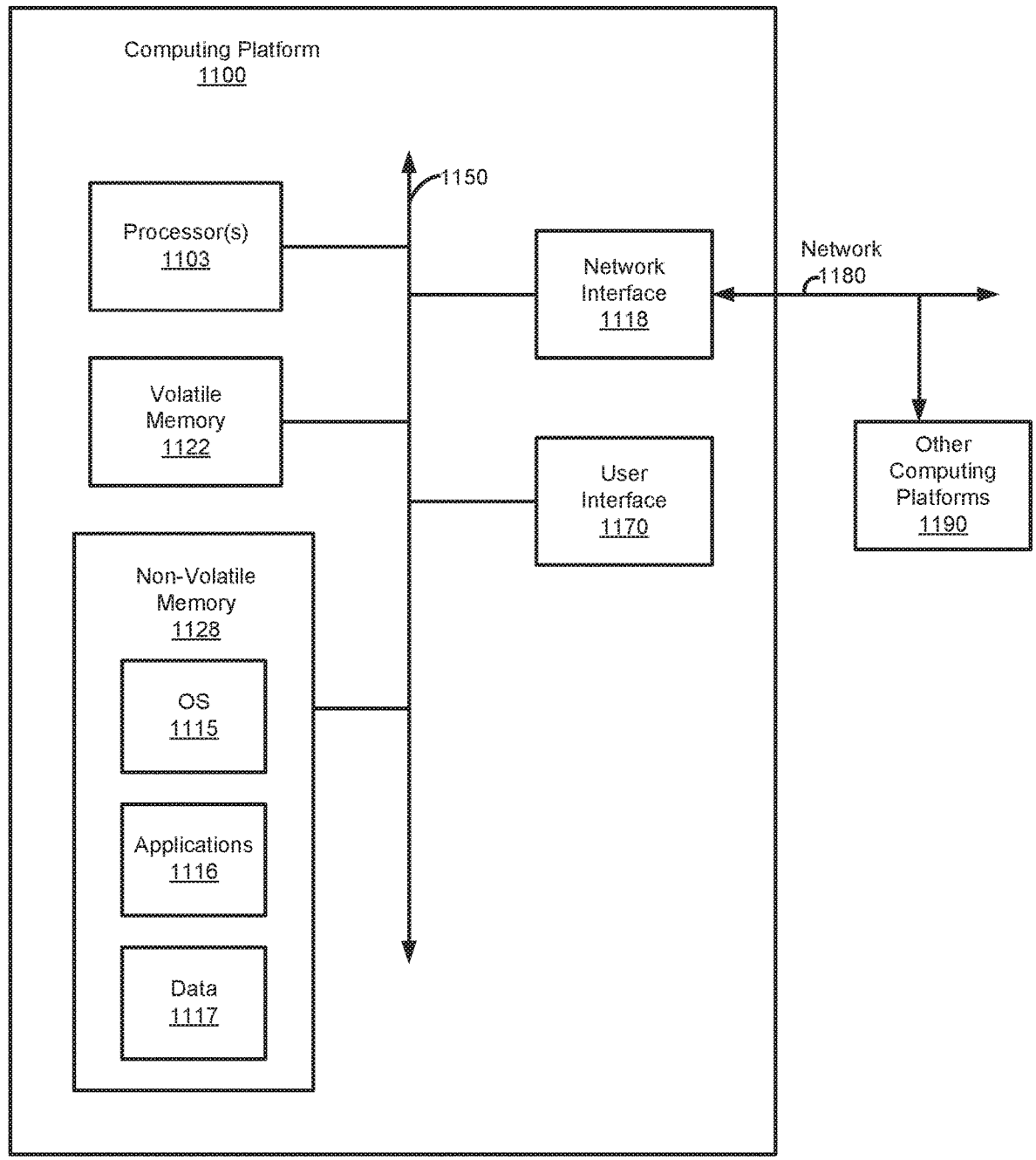
FIG. 11 is a block diagram of a network environment of computing devices in which various aspects of the present disclosure can be implemented.

FIG. 11 is a block diagram of a computing device 1100 configured to implement various adaptive bot detection systems and processes in accordance with examples disclosed herein.

The computing device 1100 includes one or more processor(s) 1103, volatile memory 1122 (e.g., random access memory (RAM)), non-volatile memory 1128, a user interface (UI) 1170, one or more network or communication interfaces 1118, and a communications bus 1150. The computing device 1100 may also be referred to as a client device, computing device, endpoint, computer, or a computer system.

The non-volatile (non-transitory) memory 1128 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1170 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 1128 stores an operating system 1115, one or more applications or programs 1116, and data 1117. The operating system 1115 and the application 1116 include sequences of instructions that are encoded for execution by processor(s) 1103. Execution of these instructions results in manipulated data. Prior to their execution, the instructions can be copied to the volatile memory 1122. In some examples, the volatile memory 1122 can include one or more types of RAM and/or a cache memory that can offer a faster response time than a main memory. Data can be entered through the user interface 1170 or received from the other I/O device(s), such as the network interface 1118. The various elements of the device 1100 described above can communicate with one another via the communications bus 1150.

The illustrated computing device 1100 is shown merely as an example client device or server and can be implemented within any computing or processing environment with any type of physical or virtual machine or set of physical and virtual machines that can have suitable hardware and/or software capable of operating as described herein.

The processor(s) 1103 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 1103 can be analog, digital or mixed. In some examples, the processor(s) 1103 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 1118 can include one or more interfaces to enable the computing device 1100 to access a computer network 1180 such as a Local Area Network (LAN), a Wide Area Network (WAN), a Personal Area Network (PAN), or the Internet through a variety of wired and/or wireless connections, including cellular connections and Bluetooth connections. In some examples, the network 1180 may allow for communication with other computing devices 1190, to enable distributed computing.

In described examples, the computing device 1100 can execute an application on behalf of a user of a client device. For example, the computing device 1100 can execute one or more virtual machines managed by a hypervisor. Each virtual machine can provide an execution session within which applications execute on behalf of a user or a client device, such as a hosted desktop session. The computing device 1100 can also execute a terminal services session to provide a hosted desktop environment. The computing device 1100 can provide access to a remote computing environment including one or more applications, one or more desktop applications, and one or more desktop sessions in which one or more applications can execute.

Figure 12:
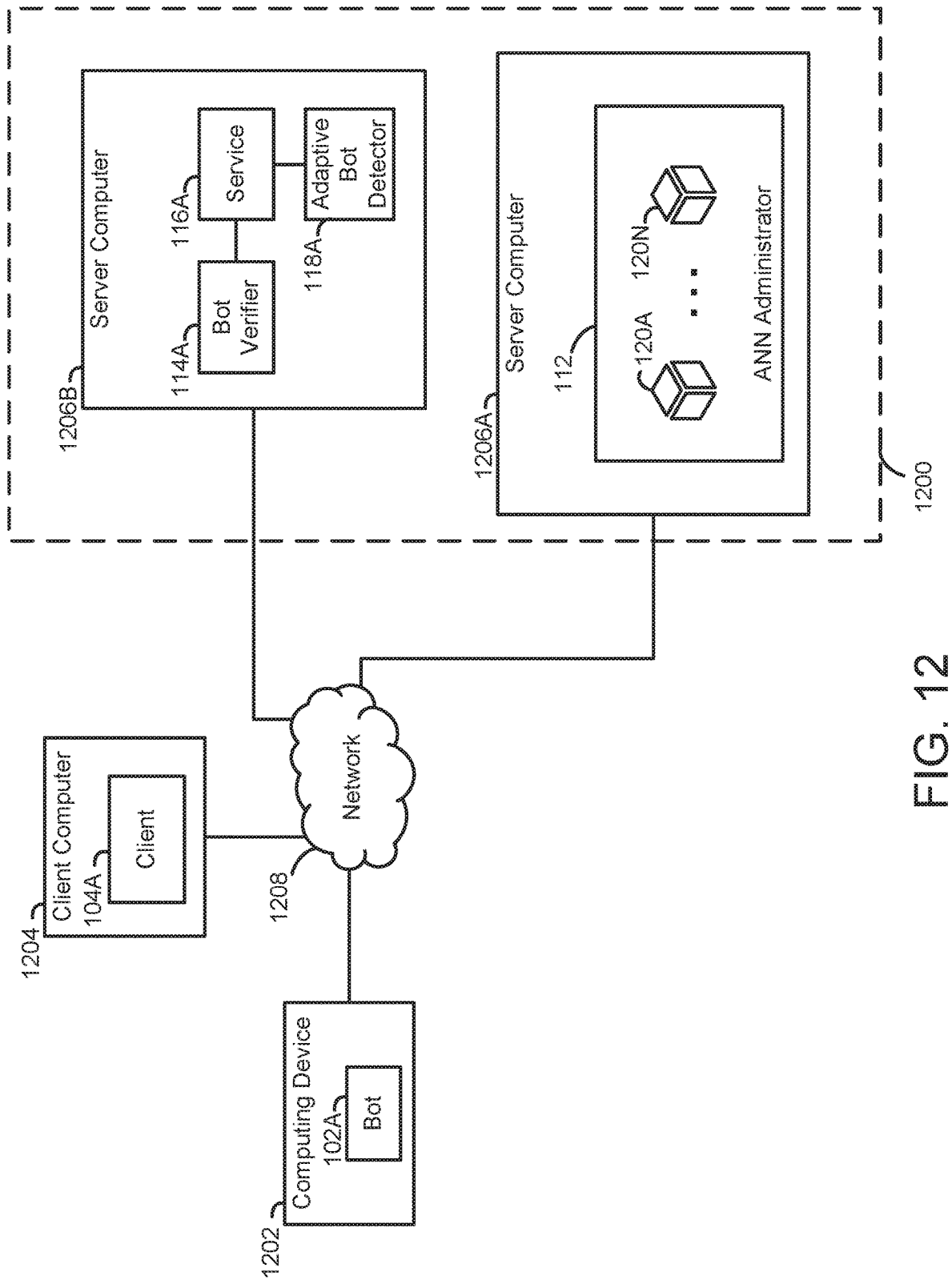
FIG. 12 is a block diagram of the system of FIG. 1 as implemented by a configuration of computing devices in accordance with an example of the present disclosure.

FIG. 12 illustrates a network computing platform 1200 (e.g., the network computing platform 100 of FIG. 1) configured for operation within a distributed computing system comprising computing devices (e.g. the computing device 1100 of FIG. 11). As shown in FIG. 12, the network computing platform 1200 includes server computers 1206A and 1206B that are configured to interoperate with one another and a client computer 1204 via a network 1208. The network 1208 can include, for example, an untrusted public network and a trusted private network. In this configuration, the server computers 1206A and 1206B interoperate with one another by exchanging data via the trusted private network, and the server computer 1206B interoperates with the client computer 1204 via the untrusted public network. As is further illustrated in FIG. 12, a computing device 1202 is also coupled with the untrusted public network.

The server computer 1206B is configured to host a protected service including the bot verifier 114A, the service 116A, and the adaptive bot detector 118A of FIG. 1. The server computer 1206A is configured to host the ANN archive 112 of FIG. 1. The client computer 1204 is configured to host the client 104A of FIG. 1. The computing device 1202 is configured to host the bot 102A of FIG. 1. Examples of the client computer 1204 and the server computers 1206A and 1206B include the computing device 1100 of FIG. 11.

The network computing platform 1200 is but one example of many potential configurations that can be used to implement adaptive bot detectors. As such, the examples disclosed herein are not limited to the particular configuration and other configurations are considered to fall within the scope of this disclosure.

FURTHER EXAMPLES

While the examples described above utilize ANNs within adaptive bot detectors, in other examples, other types of machine learning processes are employed as classifiers. For instance, some examples utilize a support vector machine (SVM) in the place of ANNs to provide the similar functionality. Other examples utilize processes based on Bayesian approaches. Within these examples, the ANN archive is replaced with an archive that stores these other types of machine learning processes. The adaptive bot detector stores and utilizes generations of these other types of machine learning processes. The engines within the adaptive bot detector classify the ostensible clients using the other types of machine learning processes. The trainer trains the other types of machine learning processes. Thus, examples that utilize other types of trainable machine learning processes are considered to fall within the scope of this disclosure.

In addition, at least some of the examples described herein are applicable to other types of anomaly detection problems that have an automated verification process available. Examples of these sorts of anomaly detection problems include determining whether time to first byte (TTFB) measurements are attributable to central processing unit (CPU) overutilization or other factors, determining whether dropped network packets are attributable to transmission control protocol (TCP) congestion or random loss, and determining whether biometrics measurements received by a computer are attributable to a previously identified human or a stranger.

For instance, in examples directed to TTFB measurements, a service (e.g., the service 116 of FIG. 1) can calculate a TTFB measurement (e.g., at a load balancer) and can transmit a detection request to a bottleneck detector (in place of the bot detector 118 of FIG. 1) where the TTFB exceeds a threshold value (e.g., 1 second). In these examples, the bottleneck detector can determine whether the protracted TTFB measurement is attributable to CPU overutilization or other factors such as load distribution within the load balanced system, capabilities of system hardware other than the CPUs, and/or the number of CPUs included in the system.

More specifically, the bottleneck detector can classify, using a master ANN engine, the bottleneck as either CPU-based or non-CPU based and can transmit a detection response to the service indicating this classification. In some examples, the master ANN engine can generate this classification by supplying a plurality of parameters indicative of a source of the bottleneck to the input nodes of its master ANN. These parameters can include, for example, parallel connection count, connections per second, and bandwidth per server.

Further, in these examples, the service can receive and process the detection response and can transmit a verification request to a bottleneck verifier (in place of the bot verifier 114 of FIG. 1) where the detection response indicates that the protracted TTFB measurement is attributable to CPU overutilization. The bottleneck verifier can include, for example, a monitoring service that can definitively determine, over a period of time spanning hundreds of connections, whether the source of the bottleneck is CPU overutilization. The bottleneck verifier can then transmit a verification response to the service. The service, in turn, can generate and transmit a teachable moment to the bottleneck detector. The bottleneck detector can use the teachable moment to train and evaluate its master ANN and other community ANNs and iteratively evolve to higher levels of accuracy.

In examples directed to dropped network packets, a service (e.g., the service 116 of FIG. 1) can detect dropped packets and can transmit a detection request to a congestion detector (in place of the bot detector 118 of FIG. 1) where a percentage of dropped packets exceeds a threshold value (e.g., 2.5%). In these examples, the congestion detector can determine whether the high percentage of dropped packets is attributable to TCP congestion or other factors, such as random packet loss.

More specifically, the congestion detector can classify, using a master ANN engine, a source of the dropped packets as either TCP congestion or not TCP congestion and can transmit a detection response to the service indicating this classification. In some examples, the master ANN engine can generate this classification by supplying a plurality of parameters indicative of the source of the dropped packets to the input nodes of its master ANN. These parameters can include, for example, link bandwidth, average intra packet gap, average round trip time, and average window size. In some examples, the average intra packet gap, average round trip time, and average window size can each be accumulated in a distinct array in which each element is a count of a number of averages that fall within a range of average values associated with the element. Each element of these arrays can be provided to a corresponding input node of the master ANN to generate the classification described above. The number of elements in these arrays, and the range of average values associated with each element can vary between examples.

Further, in some examples, the service can receive and process the detection response and can transmit a verification request to a congestion verifier (in place of the bot verifier 114 of FIG. 1) where the detection response indicates that the source of the dropped packets is TCP congestion. The congestion verifier can include, for example, a simple network management protocol (SNMP) monitoring service that can definitively determine, over thousands of packets, whether the source of the dropped packets is TCP congestion. The congestion verifier can then transmit a verification response to the service. The service, in turn, can generate and transmit a teachable moment to the congestion detector. The congestion detector can use the teachable moment to train and evaluate its master ANN and other community ANNs and iteratively evolve to higher levels of accuracy.

In examples directed to identify verification via biometric measurements, a service (e.g., the service 116 of FIG. 1) can attempt to authenticate a user via biometric measurement by transmitting a detection request to an identity detector (in place of the bot detector 118 of FIG. 1) in response to an attempt by a person to access a system. In these examples, the identity detector can determine whether the person is an established user of the system or a stranger.

More specifically, the identity detector can classify, using a master ANN engine, the person as either a user or a stranger and can transmit a detection response to the service indicating this classification. In some examples, the master ANN engine can generate this classification by supplying a plurality of parameters indicative of the identity of a person to the input nodes of its master ANN. In examples directed to facial recognition, these parameters can include, for example, a distance between the person's eyes, the width of the person's nose, the depth of the person's eye sockets, the shape of the person's cheekbones, and the length of the person's jaw line. It should be noted that other examples can, alternatively or additionally, include other biometric measurements, such as a fingerprint scanning, retinal scanning, and voice recognition, among others.

In some examples, the service can receive and process the detection response and can transmit a verification request to an identity verifier (in place of the bot verifier 114 of FIG. 1) where the detection response indicates that the person is a stranger. The identity verifier can require, for example, two factor authentication to definitively identify the person. The identity verifier can then transmit a verification response to the service. The service, in turn, can generate and transmit a teachable moment to the identity detector. The identity detector can use the teachable moment to train and evaluate its master ANN and other community ANNs and iteratively evolve to higher levels of accuracy.

As illustrated by the various examples described above, the anomaly systems and method described herein can include, or be implemented by, a computer system including a memory, a network interface, and a processor coupled to the memory and the network interface. The processor can be configured to receive a response to a request to verify whether an ostensible anomaly (e.g., a potential bot, potential CPU overutilization, potential TCP congestion, or a potential stranger, among others) is an actual anomaly (e.g., an actual bot, actual CPU overutilization, actual TCP congestion, an actual stranger). The response can include a definitive indicator of whether the ostensible anomaly is an actual anomaly.

Continuing these examples, the processor can be further configured to receive information (e.g. parameters) indicative of whether the ostensible anomaly is an actual anomaly. The processor can be further configured to train a plurality of machine learning classifiers using the information and the definitive indicator to generate a next generation of the plurality of machine learning classifiers. The plurality of machine learning classifiers can include a master classifier and one or more community classifiers. The one or more community classifiers can include a peer classifier, an alpha classifier, and an historical classifier. The processor can be further configured to calculate an accuracy of each machine learning classifier of the plurality of machine learning classifiers. The processor can be further configured to determine whether any particular machine learning classifier of the next generation has an accuracy that transgresses a threshold value based on the accuracy of an ancestor classifier of the particular machine learning classifier; and replace the particular machine learning classifier with the ancestor classifier where the accuracy of the particular machine learning classifier transgresses the threshold value. The processor can be further configured to determine whether any particular machine learning classifier of the next generation has an accuracy that transgresses a threshold value based on the accuracy of the master classifier; and replace the master classifier with the particular machine learning classifier to generate a new master classifier where the accuracy of the particular machine learning classifier transgresses the threshold value. The plurality of machine learning classifiers can be a first plurality of machine learning classifiers and the at least one processor can be further configured to add, as a peer classifier, the new master classifier to a second plurality of machine learning classifiers comprising a second master classifier.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory;
a network interface; and
at least one processor coupled to the memory and the network interface and configured to
receive a response to a completely automated public Turing test to tell computers and humans apart (CAPTCHA) challenge to verify whether an ostensible client of a service is actually a client or a bot, the response including an indicator of whether the ostensible client is a client or a bot;
receive information descriptive of interoperations between the ostensible client and the service that are indicative of whether the ostensible client is a client or a bot;
train a plurality of machine learning classifiers using the information and the indicator to generate a next generation of the plurality of machine learning classifiers, wherein the plurality of machine learning classifiers includes a master classifier and one or more community classifiers;
calculate an accuracy of each machine learning classifier of the plurality of machine learning classifiers;
determine whether any community classifier of the next generation of machine learning classifiers has an accuracy that exceeds an accuracy of the master classifier by a first threshold amount; and
replace the master classifier with a particular community classifier of the one or more community classifiers to generate a new master classifier where the accuracy of the particular community classifier exceeds the accuracy of the master classifier by the first threshold amount.

2. The computer system of claim 1, wherein the information descriptive of the interoperations includes one or more of source Internet Protocol (IP) address, destination IP address, source port, destination port, protocol, total packets exchanged, average inter arrival time of packets, and average time between mouse clicks.

3. The computer system of claim 1, wherein the plurality of machine learning classifiers comprise a plurality of artificial neural networks.

4. The computer system of claim 1, wherein the one or more community classifiers comprise a peer classifier, an alpha classifier, and an historical classifier.

5. The computer system of claim 1, wherein the at least one processor is further configured to:
determine whether any particular machine learning classifier of the next generation of the plurality of machine learning classifiers has an accuracy that transgresses a threshold value based on the accuracy of an ancestor classifier of the particular machine learning classifier; and
replace the particular machine learning classifier with the ancestor classifier where the accuracy of the particular machine learning classifier transgresses the threshold value.

6. The computer system of claim 1, wherein the at least one processor is further configured to:
identify a first community machine learning classifier of the next generation of the plurality of machine learning classifiers that has an accuracy that exceeds the accuracy of the master classifier by the first threshold amount; and
replace the master classifier with the first community machine learning classifier to generate a new master classifier.

7. The computer system of claim 6, wherein the at least one processor is further configured to store the master classifier in a data store.

8. The computer system of claim 6, wherein the plurality of machine learning classifiers are a first plurality of machine learning classifiers and the at least one processor is further configured to add, as a peer classifier, the new master classifier to a second plurality of machine learning classifiers comprising a second master classifier.

9. The computer system of claim 6, wherein the memory includes an archive, and wherein the at least one processor is further configured to store in the archive the master classifier that was replaced by the first community classifier.

10. The computer system of claim 1, wherein the at least one processor is further configured to:
determine that the accuracy of a particular community classifier of the next generation of machine learning classifiers has decreased by second threshold amount; and
replace the particular community classifier with a new community classifier.

11. The computer system of claim 1, wherein the at least one processor is further configured to:
determine whether any particular machine learning classifier of the next generation of the plurality of machine learning classifiers has an accuracy that has decreased below a threshold value based on the accuracy of an ancestor classifier of the particular machine learning classifier; and
replace the particular machine learning classifier with a new machine learning classifier where the accuracy of the particular machine learning classifier has decreased below the threshold value.

12. A method of automatically training a plurality of machine learning classifiers to detect bots, the method comprising:
receiving a response to a completely automated public Turing test to tell computers and humans apart (CAPTCHA) challenge to verify whether an ostensible client of a service is actually a client or a bot, the response including an indicator of whether the ostensible client is a client or a bot;
receiving information descriptive of interoperations between the ostensible client and the service that are indicative of whether the ostensible client is a client or a bot;
training a plurality of machine learning classifiers using the information and the indicator to generate a next generation of the plurality of machine learning classifiers, wherein the plurality of machine learning classifiers includes a master classifier and one or more community classifiers;
calculating an accuracy of each machine learning classifier of the next generation of the plurality of machine learning classifiers;
determining whether any community classifier of the next generation of machine learning classifiers has an accuracy that exceeds an accuracy of the master classifier by a first threshold amount; and
replacing the master classifier with a particular community classifier of the one or more community classifiers to generate a new master classifier where the accuracy of the particular community classifier exceeds the accuracy of the master classifier by the first threshold amount.

13. The method of claim 12, wherein receiving the information comprising receiving information including one or more of source Internet Protocol (IP) address, destination IP address, source port, destination port, protocol, total packets exchanged, average inter arrival time of packets, and average time between mouse clicks.

14. The method of claim 12, further comprising:
determining whether any particular machine learning classifier of the next generation of the plurality of machine learning classifiers has an accuracy that transgresses a threshold value based on the accuracy of an ancestor classifier of the particular machine learning classifier; and
replacing the particular machine learning classifier with the ancestor classifier where the accuracy of the particular machine learning classifier transgresses the threshold value.

15. The method of claim 12, further comprising:
identifying a first community classifier of the next generation of the plurality of machine learning classifiers that has an accuracy that exceeds the accuracy of the master classifier by the first threshold amount; and
replacing the master classifier with the first community classifier to generate a new master classifier.

16. The method of claim 15, wherein the plurality of machine learning classifiers are a first plurality of machine learning classifiers and the method further comprises adding, as a peer classifier, the new master classifier to a second plurality of machine learning classifiers comprising a second master classifier.

17. The method of claim 15, further comprising:
storing, in an archive, the master classifier that has been replaced by the first community classifier.

18. The method of claim 12, further comprising:
determining whether the accuracy of any community classifier of the next generation of machine learning classifiers has decreased by a second threshold amount.

19. The method of claim 18, further comprising:
determining that the accuracy of a first community classifier of the next generation of the plurality of machine learning classifiers has decreased by the second threshold amount; and
replacing the first community classifier with a new community classifier.

20. A non-transitory computer readable medium storing processor executable instructions to automatically train a plurality of machine learning classifiers, the instructions comprising instructions to:
receive a response to a completely automated public Turing test to tell computers and humans apart (CAPTCHA) challenge to verify whether an ostensible client of a service is actually a client or a bot, the response including an indicator of whether the ostensible client is a client or a bot;
receive information descriptive of interoperations between the ostensible client and the service that are indicative of whether the ostensible client is a client or a bot;
train a plurality of machine learning classifiers using the information and the indicator to generate a next generation of the plurality of machine learning classifiers, wherein the plurality of machine learning classifiers includes a master classifier and one or more community classifiers;
calculate an accuracy of each machine learning classifier of the next generation of the plurality of machine learning classifiers;
determine whether a particular community classifier of the next generation of the plurality of machine learning classifiers has an accuracy that transgresses a threshold value based on the accuracy of the master classifier; and replace the master classifier with the particular community classifier to generate a new master classifier where the accuracy of the particular community classifier transgresses the threshold value.

\* \* \* \* \*